June 2, 1953

N. B. MURPHY 2,640,370

HYDRAULIC SERVO SYSTEM

Filed Dec. 26, 1950

INVENTOR.
NORMAN B. MURPHY
BY
C. R. Miranda
ATTORNEY

June 2, 1953  N. B. MURPHY  2,640,370
HYDRAULIC SERVO SYSTEM

Filed Dec. 26, 1950  3 Sheets-Sheet 3

INVENTOR.
NORMAN B. MURPHY
BY
C. R. Miranda
ATTORNEY

Patented June 2, 1953

2,640,370

UNITED STATES PATENT OFFICE 2,640,370

HYDRAULIC SERVO SYSTEM

Norman B. Murphy, Tenafly, N. J., assignor to Bendix Aviation Corporation, Teterboro, N. J., a corporation of Delaware Application December 26, 1950, Serial No. 202,599

9 Claims. (Cl. 74—388)

This invention relates to automatic pilots and, more particularly, to servo units for controlling the displacement of a control surface of an aircraft.

It is customary in automatic pilot systems to provide a signal developing device such as a magnetic compass or gyroscope, which transmits an error signal to a servo unit proportional to the deviation off-reference of the craft. This error signal is amplified in some cases by a magnetic amplifier to drive a two phase servomotor which in turn displaces craft rudder, aileron or elevator surfaces, depending upon the particular control channel under consideration. This system is efficient for controlling the craft at speeds up to 300 m. p. h., which ordinarily, most present day conventional type of aircraft do not exceed. However, for recently developed aircraft whose speeds exceed 300 m. p. h. and approach sonic speeds, the torques required of the servomotors are increased because of the greater loading forces acting on the craft's control surfaces.

Due to the high velocities at which such recently developed aircraft are flown, the signal developing device of any one control channel is required to operate at a high frequency so that the aircraft is not displaced for a long period of time and distance before it is tracking its course again. Consequently, automatic pilot systems for such rapidly travelling aircraft must include servo units which have high frequency response characteristics in order to accurately and efficiently meet the demands of the error signal developing devices. A variety of problems are encountered in providing an efficient type of servo unit. One problem is to provide an automatic pilot system in which the amplitude ratio of the input and output of the system is close to unity with little attenuation within a contemplated frequency range. In addition, the servo units of the system must have high frequency response characteristics so that they will closely follow the input signals, with a minimum phase shift.

It had been proposed to increase the size of the servomotors and the magnetic amplifiers to overcome the increased loads encountered by the control surfaces at high speeds, but this proposal has proved unsuccessful because magnetic amplifiers inherently have a fairly high time constant which serves to delay the response of the servomotors to command signals.

The present invention contemplates a novel high frequency response servo mechanism which provides increased torque to displace the control surface of an aircraft. Essentially, the servo mechanism embodies electromagnetic means responsive to an amplified error signal to control a valve which in turn effects actuation of a hydraulic piston unit. A pair of motion transmitting means or clutches are driven by a constantly running motor and are selectively operated by the hydraulic piston unit to rotate an output shaft in one direction or another through differential gear means. The output is also provided with damping and followup means to stabilize the displacement of the control surface.

An object of the present invention, therefore, is to provide a novel automatic pilot system adapted for use with high speed aircraft.

Another object of the present invention is to provide a novel and improved servo mechanism for use with automatic pilot systems for high speed aircraft, the servo mechanism having high frequency response characteristics.

A further object is to provide a servo unit which embodies novel means for producing a great enough torque to overcome the load on an aircraft control surface when the craft is operating at very high speeds.

Another object is to provide a servo system which embodies novel means for keeping the amplitude ratio of the input and output of an automatic pilot system close to unity within a contemplated frequency range.

Still another object is to provide a novel servo unit embodying a constantly running motor which is independently operated and controlled, and is separate from the circuit which transmits the error signal initiated by a signal developing device.

A further object is to provide a novel hydraulic servo system for an aircraft automatic pilot wherein operating pressures are transmitted instantaneously in response to a command signal.

Still a further object is to provide a novel hydraulic servo system which embodies electromagnetic actuating means having a very small time constant.

A still further object is to provide a novel servo unit embodying a hydraulic system which acts as an amplifier having a fairly high gain.

The above and other objects and advantages of the present invention will appear more fully hereinafter from a consideration of the detailed description which follows, taken together with the accompanying drawings wherein one embodiment of the invention is illustrated.

In the drawings, wherein like reference characters refer to like parts throughout the several views, Fig. 1 is a diagrammatic illustration of the novel servo unit comprising the instant invention;

Figure 1:
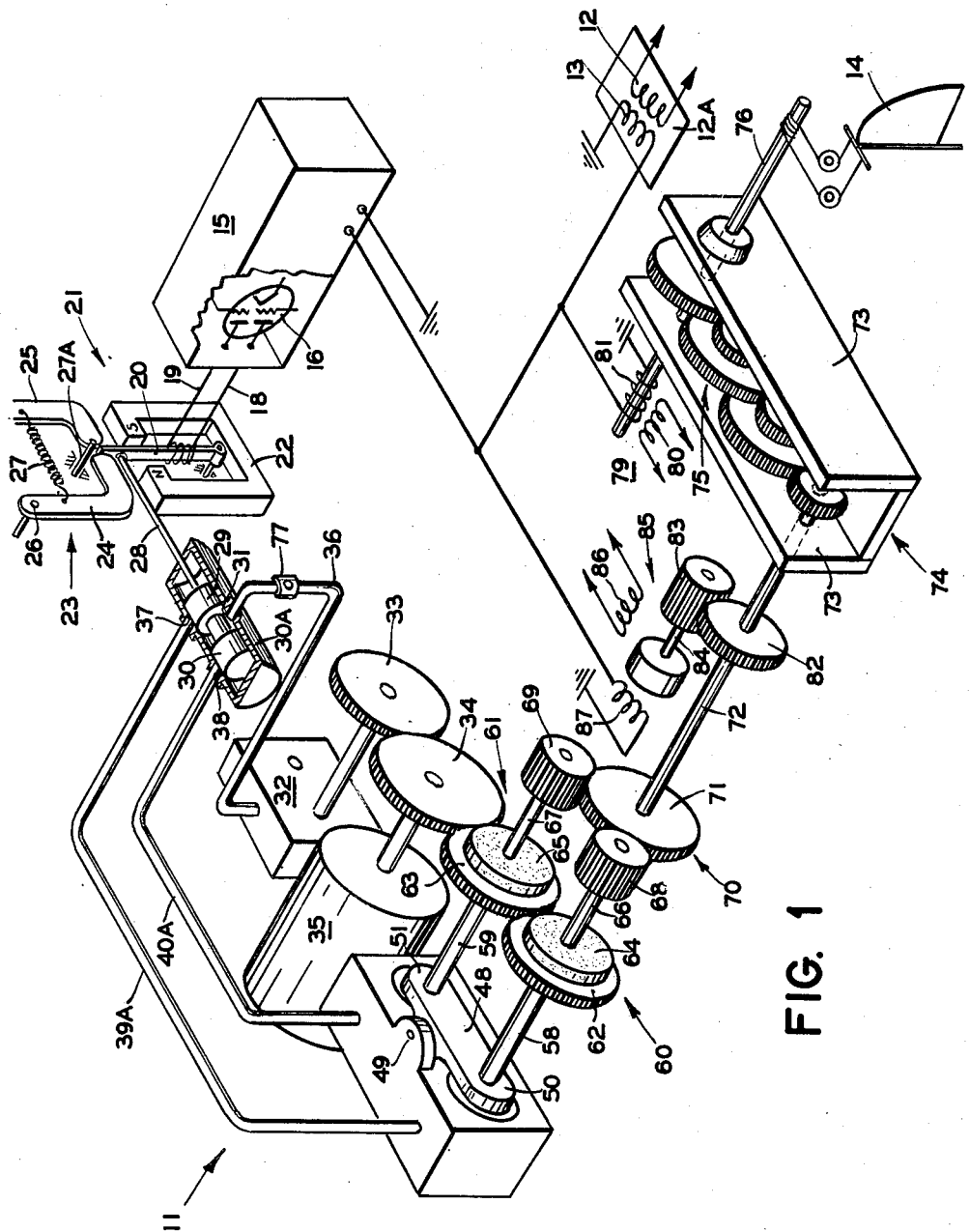

Referring now to the drawings for a more detailed description of the novel servo mechanism of the present invention, and more particularly to Figure 1 thereof, the mechanism generally designated by the numeral 11, is diagrammatically illustrated therein as incorporated in a single channel of an automatic pilot which includes a winding 12 of a signal developing device 12A. Winding 12 is the rotor winding of an inductive error signal transmitter device embodied in or connected to a course or attitude maintaining device in a well known manner, which when displaced, causes an error signal to be induced in a stator winding 13 as is well known in the art. Rotor winding 12 is energized from a suitable source of alternating current. The signal induced in stator winding 13 is proportional to the amount of deviation of the craft off of its predetermined course or attitude, as set into the auomatic pilot, and serves to displace a control surface such as, rudder 14, for example, to return the craft to its predetermined course or attitude. Rudder 14 has been chosen as the control surface, for purposes of illustration, but it is to be understood that any of the other control surfaces, such as the ailerons and elevator, may be displaced by a servo system embodying the instant invention.

The error signal induced in stator winding 13 is fed into the input of a conventional amplifier 15, shown partially in block form, having an amplification and, a discriminator stage as represented by a discriminator tube 16, which transmits at any one time a single signal or output of a phase determined by the phase of the error input signal. It is to be understood that the phase of the error signal, on the other hand, depends upon the direction of deviation of the craft from its predetermined course or attitude as developed by signal developing device 12A.

The output of amplifier 15 is fed by means of leads 18 and 19 to the winding of an armature 20 forming part of a polar actuator 21 which has a low time constant. Actuator 21 includes a permanent magnet 22 which surrounds armature 20, the latter being pivoted so that the direction of the current flowing through the winding thereof will cause it to move toward the pole piece whose magnetic sign suits the direction of current flow in the winding. In order to have the movement of armature 20 proportional to the current applied to its winding, a centering spring mechanism 23 is provided, consisting of a pair of L-shaped members 24 and 25 pivoted at points 26 (one of which only is shown) and normally urged together against a fixed pin 27A by a coil spring 27. The spring 27 is properly calibrated beforehand so that movement of armature 20 is restrained to an amount corresponding to the amplitude of the error or control signal. Upon deenergization of the winding of the armature, the latter is returned by spring 27 until the two arm members engage pin 27A, the latter defining a centralized or null position for the armature.

A rod-like member or stem 28 is suitably fixed to armature 20 at one end thereof and is secured to a control valve having a pair of spaced lands 29 and 30 at its other end. The control valve is slidable in a valve-housing 30A (Fig. 1) and is burnished and polished to such a degree that it engenders very little friction in its travel within the housing; thereby requiring a very small force to be exerted by armature 20 in actuating the control valve. Valve housing 30A has a central inlet port 31 formed therein for entry of oil, under pressure, through a pipe 36 connected to a fluid source such as a gear pump 32 (Fig. 1). The gear pump 32 may be of the two-gear type driven directly by a gear 33 mounted thereon which is in meshing engagement with a gear 34 mounted on the shaft of a constantly running motor 35. The motor 35 may be a two or three phase induction motor which is connected to a separate power source not within the circuitry of the servo system. A pair of outlet ports 37 and 38 are formed on each side of inlet port 31 and are normally aligned with lands 29 and 30 of the control valve when armature 20 is in a "null" or centralized position.

Figure 2:
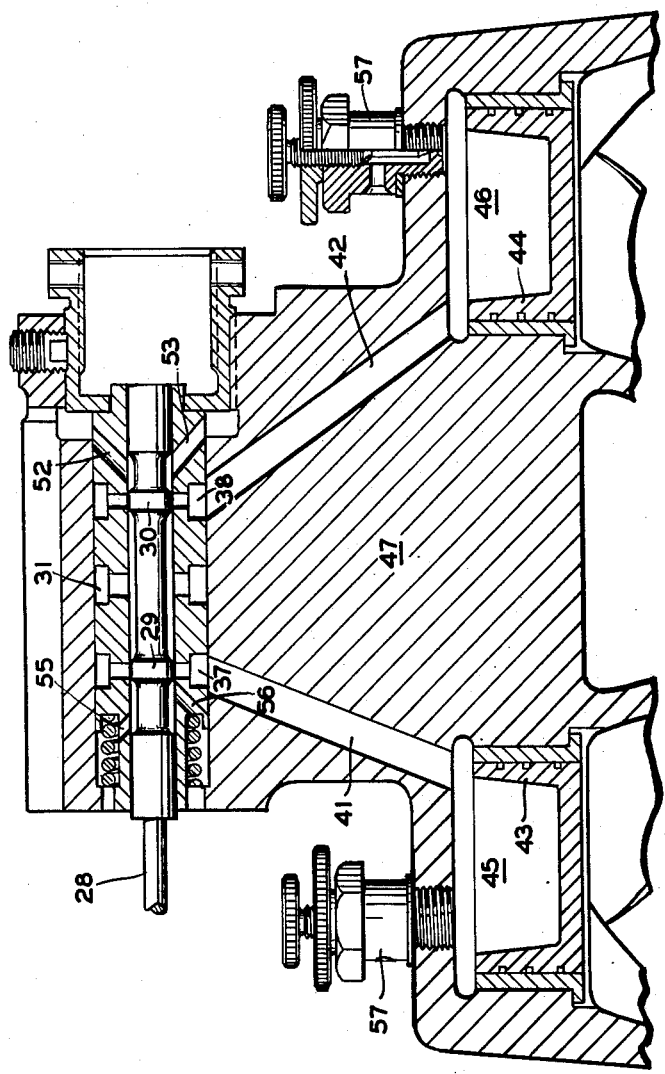
Fig. 2 is a cross sectional view of the valve and piston assembly of the servo unit of Figure 1.

While the diagrammatic showing of Figure 1, for purely explanatory purposes, positions the control valve housing 30A at a point remote from the casing containing the pistons which it controls, the outlet ports 37 and 38 of the control valve being connected to the piston casing by way of conduits 39A and 40A, in actual construction the two are formed integrally as shown in Figure 2.

As better shown in the latter figure, outlet ports 37 and 38 of the valve housing are connected to passageways 41 and 42 respectively, formed in a suitable casing 47, which communicate with a pair of displaceable pistons 43 and 44 movable in piston chambers 45 and 46 likewise formed in casing 47. The pistons 43 and 44 are cup-shaped so as to retain a predetermined amount of oil. Disposed adjacent the flat surfaced ends of the pistons 43 and 44 and mounted on the casing 47 is a walking beam or rocker arm 48 (Figure 1) pivotally mounted by way of a pin 49 journalled in a shoulder formed on the casing. The arm 48 has a pair of curved ends 50 and 51 abutting the flat ends of pistons 43 and 44 respectively. It may be seen from Fig. 2 that when the control valve is moved to the left by rod 28, oil will flow from entry port 31 through port 37 and passageway 41 to thereby displace piston 43 outwardly. Piston 43 upon being displaced forces the rocker arm 48 to pivot about point 49 to push piston 44 inwardly. The oil in passageway 42 is forced back into valve housing 30A and out therefrom through exit ports 52 and 53 formed therein to a common sump (not shown). In like manner, upon valve stem 28 being moved to the right, the piston 44 is displaced outwardly by oil flowing through port 38 and passageway 42. The "backed-off" oil, in this instance, is forced through passageway 41, port 37, exit ports 55 and 56 to the common sump. A pair of needle valves 57 are mounted on casing 47 immediately rearwardly of pistons 43 and 44 respectively, to provide for greater control or proportionality of output of the system. By varying the opening in the needle valve, the flow of oil therethrough is regulated and returned to the sump. It is to be noted that a small quantity of oil leaks by the valve lands, and, the presence of very small "bleed" holes, (not shown) in the pistons enables the system to be self-priming. Furthermore, the arrangement of the ports in the housing and lands on valve stem 29 serve to make the valve highly balanced whereby a very small force is required to move it to the left or right.

The rocker arm 48 has connected at its outer ends 50 and 51 shafts 58 and 59, respectively. The shafts 58 and 59 are selectively displaced axially upon movement of the pistons to actuate a pair of friction clutches generally designated by the numerals 60 and 61. The clutches 60 and 61 consist of meshing gear discs 62 and 63 respectively, which form the driving elements of the clutches, and include elements 64 and 65 forming driven clutch elements, the latter preferably being felt discs running in oil. The gear discs 62 and 63 are rotated in opposite directions by the constantly running motor 35 through gear 34 in mesh with the gear discs. Driven clutch elements 64 and 65 are mounted on the ends of a pair of shafts 66 and 67 which terminate in gears 68 and 69 forming part of a gear differential 70. The gears 68 and 69 mesh with a relatively large gear 71 fixed to a differential output shaft 72. The shaft 72 is journalled in the walls 13 of a gear box 74 containing a reduction gear train generally designated by the numeral 75. The motion of the differential output shaft 72 is transmitted to an output shaft 76 through the gear train 74 to displace the rudder 14 operatively connected thereto. It is to be noted that the rotating and driving clutch elements 62 and 63 are out of engagement with driven clutch elements 64 and 65 when armature 20 of the valve actuator is in its centralized or null position.

The operation of the system may now be set forth for a complete understanding of the present invention. If we assume that the aircraft deviates to the right of its predetermined course, for example, and a signal of one phase is developed, the signal will be amplified and transmitted to the winding of armature 20 causing the armature to be moved, against the action of spring 27, toward one or the other of the magnet poles depending upon the direction of current flow in the armature winding. In moving to the right, for example, armature 20 (Fig. 1) will displace the control valve to the left, looking at Fig. 2. The oil under pressure from gear pump 32 thereupon passes into valve housing 30A, through inlet port 31 and through passageway 41 to urge piston 43 outwardly. Shaft 58, being connected to end 50 of rocker arm 48, is displaced axially to move gear disc 62 into engagement with the driven clutch element 64 to drive shaft 66 and gear 68. It is to be noted that since gear 34 mounted on the motor shaft is driven in a clockwise direction, gears 62 and 68 will also be rotated clockwise. Differential output shaft 72 and gear 71 are also driven clockwise inasmuch as gear 69 is an idling gear at this instant and does not exert any rotative force upon gear 71. Clockwise motion of shaft 72 is transmitted through the gear train 75 to displace rudder 14 so that the craft will return to its predetermined course.

It follows from the foregoing description that since motor 35 is not energized by the amplifier 15 the motor may be made as large as torque requirements demand without increasing the size of the amplifier. In addition, inasmuch as pressures are transmitted through oil instantaneously, and the polar actuator 21 has a very small time constant, the novel hydraulic servo system hereof will be highly responsive in time to an error signal. The feasibility of utilizing a hydraulic unit over an electrical unit to effect a high acceleration on the output is evident due to the low inertia of the clutches and gear train as compared with the amount of torque transmitted through the clutches. It is to be noted that acceleration of the system depends upon torque divided by inertia. Therefore, a low inertia with a high torque will result in greater acceleration to provide for a flexible system. In the invention, pump pressure is maintained at a constant pressure by means of a pressure relief valve 77 located in a pipe line 36 connecting the gear pump 32 with entry port 31 (Fig. 1). Should the motor speed drop due to an overload on the servo, then pump speed is reduced and total pressure on clutches 60 and 61 is reduced proportionately, hence the clutch will slip and relieve the load from the motor. The unit therefore, will have clutch capacities such that motor 35 can never be stalled but can be limited to a safe overload of approximately 10% or 15% slip from synchronous speed.

In order to provide for a follow-up electrical signal to cancel out the error signal as the craft approaches its predetermined course, an inductive follow-up device 79 having an energized stator winding 80 and an inductively coupled rotor winding 81 fastened to output shaft 76, is provided. Relative movement of the two windings provides a signal in the rotor winding to oppose the error signal developed in stator winding 13 of the reference device. Rotor winding 81 is connected in series with stator winding 13 to amplifier 15 so that the signals add vectorially. Thus, the signal from inductive follow-up device 79 will have cancelled the error signal from the inductive reference device as the craft reaches its predetermined course. Differential output shaft 72 also carries a gear 82 which drives a gear 83 mounted on the rotor shaft 84 of a rate generator 85. The rate generator may be a two phase induction motor, driven to act as a generator, and to this end the rotor thereof is fastened to rotate with shaft 84, relative to a first winding 86, connected to a suitable energizing source (not shown) whereby a signal corresponding to the rate of servo movement is developed by induction in a second winding 87. Rate generators are well known in the art and the instant generator 85 is utilized to dampen the effects of the inertia of the rotating mechanical elements employed. Upon rotation of differential output shaft 72, a rate damping signal is induced in winding 87 which is connected in series with windings 13 and 81, and is added vectorially to the error and follow up signals to eliminate hunting of the craft about its predetermined course and to provide dead beat remote control for returning the rudder to a null position.

Figure 3:
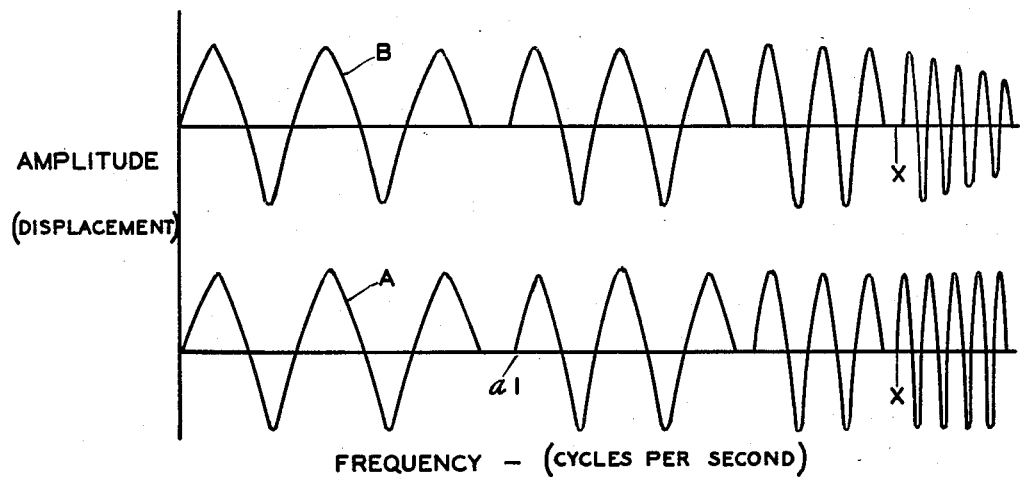
Fig. 3 is an illustration of two sinusoidal curves which graphically show the input and output of the system; and, Fig. 4 is a graph which discloses the amplitude ratio and phase relation of the input and output of the servo system.
Figure 4:
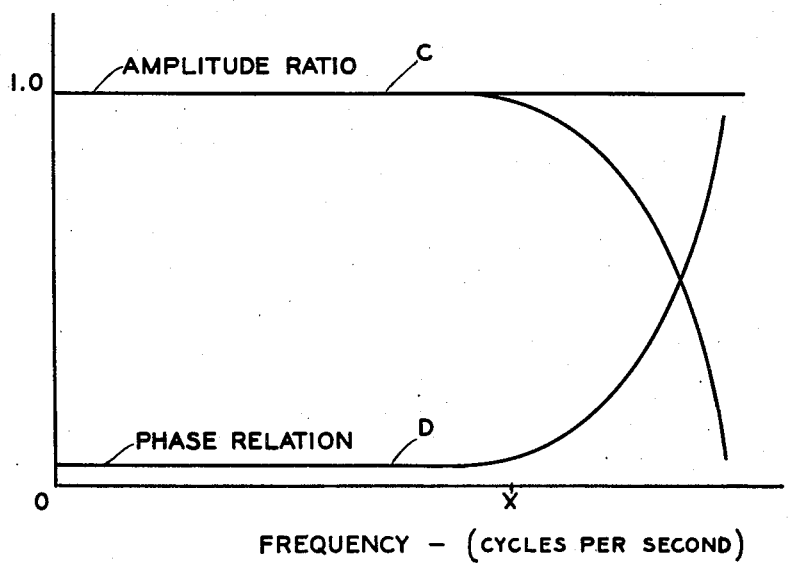

The requirements of a high frequency servo unit for use with high speed aircraft are accomplished by the instant invention, and are graphically illustrated by Figures 3 and 4. Fig. 3 discloses a curve A which represents the input to the servo unit 11 by the signal developing device 12A while curve B represents the output of the servo unit for displacing rudder 14. It may be readily understood by those skilled in the art that the frequency response characteristics of the servo unit must be high and at the same time must closely approximate the operation of the signal developing device 12A. In other words, the rudder 14 must follow closely the demands made upon it by the device 12A. This is clearly shown in Fig. 3 wherein the sinusoidal input curve A having a definite frequency and amplitude (displacement) is followed closely by curve B. The contemplated frequency range in which the automatic pilot system is to operate, ranges from 0 to "X" cycles per second.

Examining Fig. 3 further, it is noted that the frequency of curve A begins to increase at point "a1," and continues increasing up to and beyond "X" cycles per second. The frequency and amplitude of curve B is the same as the frequency and amplitude of curve A until "X" cycles per second is reached. Beyond "X" cycles per second the curve B has a definite change in frequency and amplitude as compared with curve A. Curve B at point "X" begins to shift in phase and also decreases in amplitude. From the foregoing, it is apparent that the operation of the craft is stable up to "X" cycles per second, but immediately thereafter, the response of the servo unit 11 in effecting an output displacement, as illustrated by curve B, becomes erratic and unstable. Therefore, the input and output frequencies are to be kept below the critical limit "X" in order to ensure maximum efficient operation of an automatic pilot system. The critical point "X" varies with different types of aircraft and is determined by the natural frequency of the craft, inertia of the moving parts and the maximum speed of the craft.

Fig. 4 graphically illustrates more clearly the relation of curve A to curve B within the contemplated frequency range. Curve C, representing the amplitude ratio of curves A and B, remains at unity until it approaches point "X" whereupon attenuation sets in and the curve swings sharply downwardly. Curve D, which represents the phase relation of curves A and B, continues in a straight line until it approaches "X" whereupon it moves sharply upwardly. Since the aircraft is to operate within the frequency range of 0 to "X," the "veering off" of the curves after "X" C. P. S. is immaterial.

From the foregoing, it is readily apparent that the instant invention provides a highly effective servo unit which is responsive to high input frequencies required in high speed aircraft. The response characteristics of the instant servo unit are effective for any frequency required, its frequency response range being limited only by mechanical limitations. This is exceedingly important for high velocity craft because any lag in the system or attenuation of amplitude makes the craft unstable in operation and difficult to maneuver. In addition, the utilization of a hydraulic servo unit together with a constantly running motor to instantaneously provide a torque great enough to effectively overcome the loads applied to the control surfaces of high speed craft eliminates the need of larger magnetic amplifiers.

Although one embodiment of the invention has been illustrated and described in detail, it is to be expressly understood that the invention is not limited thereto. Various changes may be made in the design and arrangement of the parts without departing from the spirit and scope of the invention as will now be understood by those skilled in the art.

I claim:

1. An automatic pilot for a high speed aircraft having a movable control surface thereon, comprising a device for developing a control signal of a phase determined by the direction of craft displacement from a pre-selected reference, reversible means for moving the surface in one direction or another comprising a pair of oppositely driven members, a continuously operating motor for driving said driven members, a normally disengaged clutch which, when engaged, connects one of the driven members to move the surface in one direction, a second normally disengaged clutch which, when engaged, connects the other of the driven members to move the surface in another direction, actuating means comprising a pivotal member which, when pivoted in one direction, engages the first clutch whereby the surface is moved in said one direction, and which, when pivoted in another direction, engages the second clutch whereby the surface is moved in said other direction, and means responsive to said control signal for operating said pivoted member in one direction or another depending upon the phase of the signal.

2. An automatic pilot for a high speed aircraft having a movable control surface thereon, comprising a device for developing a control signal of a phase determined by the direction of craft displacement from a pre-selected reference, reversible means for moving the surface in one direction or another comprising a pair of engaging and oppositely driven members, a continuously operating constant speed motor for driving said driven members, a normally disengaged clutch which, when engaged, connects one of the driven members to move the surface in one direction, a second normally disengaged clutch which, when engaged, connects the other of the driven members to move the surface in another direction actuating means which, when operated in one direction, engage the first clutch whereby the surface is moved in said one direction, and which, when operated in another direction, engage the second clutch whereby the surface is moved in said other direction, electromagnetic means comprising an element mounted for movement in two directions, said movably mounted element responding to said signal and movable in a direction determined by the phase of the signal, means connecting said movably mounted element to control operation of the actuating means, and means for normally centralizing said movably mounted element.

3. An automatic pilot for a high speed aircraft having a movable control surface thereon, comprising a device for developing a control signal of a magnitude and phase determined by the amount and direction of craft displacement from a pre-selected reference, reversible means for moving the surface in one direction or another comprising a pair of oppositely driven members, a continuously operating constant speed motor for driving said driven members, a normally disengaged clutch which, when engaged, connects one of the driven members to move the surface in one direction, a second normally disengaged clutch which, when engaged, connects the other of the driven members to move the surface in another direction, clutch actuating means which, when operated in one direction, engage the first clutch whereby the surface is moved in said one direction, and which, when operated in another direction, engage the second clutch whereby the surface is moved in said other direction, electromagnetic means comprising a pivotally mounted member movable in two directions, said pivotally mounted member responding to said signal and movable in a direction determined by the phase of the signal, means connecting said pivotally mounted member to control operation of the actuating means, and yieldable means opposing movement of said pivotally mounted member whereby the amount of movement by said pivotally mounted member corresponds to the magnitude of the control signal.

4. An automatic pilot for a high speed aircraft having a movable control surface thereon, comprising a device for developing a control signal of a phase determined by the direction of craft displacement from a pre-selected reference, reversible means for moving the surface in one direction or another comprising a pair of oppositely driven members, a gear reduction system having an input and an output with the input thereof connected to said reversible means and the output thereof connected to said surface, a continuously operating motor for driving said driven members, a normally disengaged clutch which, when engaged, connects one of the driven members to move the surface through said gear system in one direction, a second normally disengaged clutch which, when engaged, connects the other of the driven members to move the surface through said gear system in another direction, clutch actuating means which, when operated in one direction, engage the first clutch whereby the surface is moved in said one direction, and which, when operated in another direction, engage the second clutch whereby the surface is moved in said other direction, means responsive to said control signal for operating said actuating means in one direction or another depending upon the phase of the control signal, a follow-up signal developing device operable from the output of said gear system, a signal device operable from the input of said gear system for developing a signal corresponding to the rate of operation of the reversible means, and means connecting the follow-up and rate signal developing devices for modifying said control signal.

5. In an automatic pilot system for high speed aircraft having a movable control surface thereon together with a displacement signal generator for operating the control surface, a servo mechanism comprising an output shaft operatively connected for displacing said control surface, a pair of oppositely driven members adapted to be selectively actuated and connected for operating said output shaft in one direction or another depending upon the member actuated, a continuously operating motor for driving said driven members, a normally disengaged clutch associated with each of said driven members and with said motor, one or the other of said clutches, when engaged, connecting its associated driven member to said motor to thereby actuate the member, whereby selective directional operation of said output shaft is obtained, a fluid motor for selectively engaging one or the other of said clutches, valve means controlling the operation of said fluid motor, and electromagnetic means responsive to the output of said signal generator for operating said valve means to thereby control the actuation of said clutches and said driven members.

6. In an automatic pilot system for high speed aircraft for displacing a control surface in accordance with a control signal to return the craft to a predetermined reference, a high frequency response hydraulic servo system comprising electromagnetic means for receiving the control signal, valve means actuated by said electromagnetic means, reversible means for moving the surface in one direction or another comprising a pair of oppositely driven members, a continuously operating motor for driving said driven members, a fluid motor operable by said valve means, and clutch means operatively associated with said continuously operating motor and said driven members, said clutch means being operable by said fluid motor to selectively connect said continuously operating motor with one or the other of said members to displace said control surface an amount proportional to said control signal.

7. In an automatic pilot for displacing an aircraft control surface in accordance with a control signal, means comprising an electromagnetic device having an armature adapted to be moved in accordance with the signal, a valve connected to the armature of said electromagnetic device and actuated thereby, a fluid motor operable by said valve, differential gearing means having an output shaft operatively connected for moving said surface in one direction or another and comprising a pair of oppositely driven members, a continuously operating motor for driving said driven members, clutch means operatively associated with said continuously operating motor and said driven members, said clutch means being operable by said fluid motor to selectively connect said continuously operating motor to one or the other of said driven members to effect displacement of said control surface, a follow-up signal developing device operable in response to displacement of said control surface, a signal device operable from said output shaft for developing a signal corresponding to the rate of operation of said output shaft, and means connecting the follow-up and rate signal developing devices for modifying said control signal.

8. In an automatic pilot for displacing an aircraft control surface in accordance with a control signal, means comprising an electromagnetic device having an armature adapted to be moved in accordance with the signal, a valve connected to the armature of said electromagnetic device and actuated thereby, a fluid motor comprising a pair of pistons adapted to be selectively operated in response to movement of said valve, a pivotal rocker arm operatively associated with said pistons and pivoted thereby when one of said pistons is operated by said valve, reversible means comprising a pair of oppositely driven members, a continuously operating motor for driving said driven members, a normally disengaged clutch associated with each of said driven members and said continuously operating motor, said clutches being selectively engaged by said rocker arm to connect said continuously operating motor with one or the other of said driven members, and an output shaft responsive to the output of said reversible means for moving said control surface in accordance with the control signal.

9. In an automatic pilot for displacing an aircraft control surface in accordance with a control signal, means comprising an elctromagnetic device having an armature displaceable in accordance with the signal, a centering spring device for restraining displacement of said armature proportional to the magnitude of the signal, valve means movable by said armature, a fluid pump, conduit means for communicating said valve means with the output of said pump, a fluid motor comprising a pair of fluid actuated pistons selectively operated in response to the movement of said valve means, a normally disengaged clutch associated with each of said pistons and engageable thereby when the latter are operated, a differential gearing arrangement comprising a pair of oppositely driven members, a differential output shaft operatively connected for displacing said control surface in a direction depending upon which member is driven, and a continuously operating motor connected for driving said driven members and said fluid pump, said motor being operatively connected to drive said driven members upon engagement of said clutches.

NORMAN B. MURPHY.

References Cited in the file of this patent

UNITED STATES PATENTS

| Number | Name | Date |
|---|---|---|
| 2,311,010 | Vickers | Feb. 16, 1943 |
| 2,398,421 | Frische et al. | Apr. 16, 1946 |
| 2,425,733 | Gille et al. | Aug. 19, 1947 |
| 2,530,725 | Pizer | Nov. 21, 1950 |
| 2,555,019 | Webb | May 29, 1951 |